(No Model.)

A. H. & I. C. MATATALL.
ELECTRICALLY WELDED PIPE JOINT.

No. 569,836. Patented Oct. 20, 1896.

WITNESSES:
Robert Sollberger
C. B. Tilney

INVENTORS:
Albert H. Matatall,
Ira C. Matatall,
BY Drake & Co. ATTY'S.

UNITED STATES PATENT OFFICE.

ALBERT H. MATATALL AND IRA C. MATATALL, OF HARRISON, NEW JERSEY.

ELECTRICALLY-WELDED PIPE-JOINT.

SPECIFICATION forming part of Letters Patent No. 569,836, dated October 20, 1896.

Application filed August 26, 1895. Serial No. 560,485. (No model.)

*To all whom it may concern:*

Be it known that we, ALBERT H. MATATALL and IRA C. MATATALL, citizens of Canada, residing at Harrison, in the county of Hudson and State of New Jersey, have invented certain new and useful Improvements in Electrically-Welded Pipe-Joints; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates more particularly to that class of pipe connections the unions or joints of which are formed by electrical cementation or welding; and it consists in the process of uniting or welding metallic pipes, substantially as will be hereinafter set forth, and finally embraced in the claim.

Figure 1:
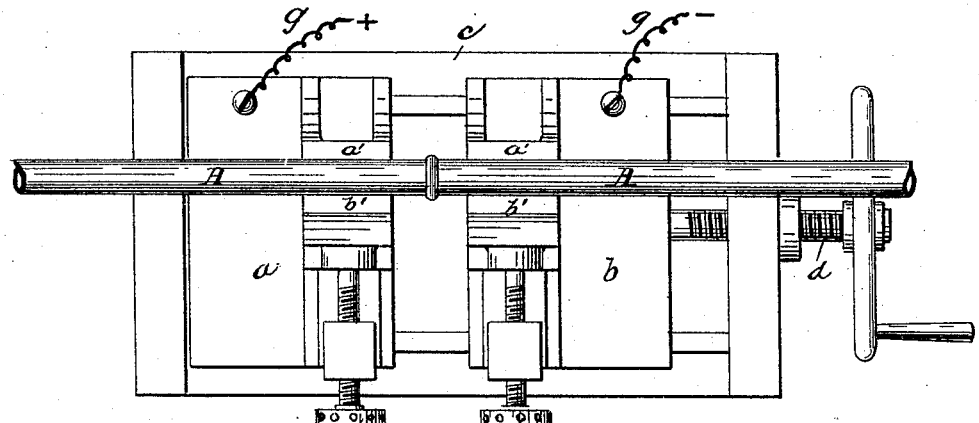
Figure 2:
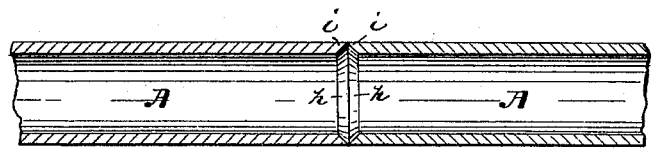
Figure 3:
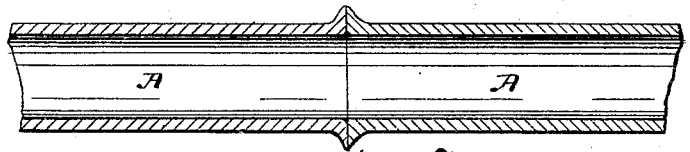
Figure 4:
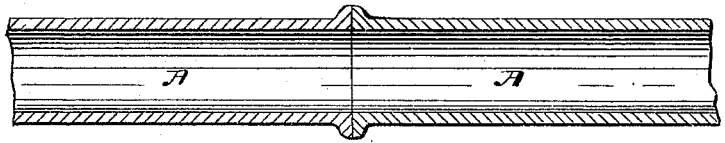

Referring to the accompanying drawings, in which like letters of reference indicate corresponding parts in each of the views, Figure 1 is a plan of an electrical welding-machine, such as is commonly employed. Fig. 2 is a sectional view of abutting pipe-sections in the first stage of welding said sections together. Fig. 3 is a similar section showing the pipe in an advanced stage, and Fig. 4 illustrates the pipe in its final or complete stage of manufacture.

In said drawings, $a$ $b$ are fixed and sliding clamps or jaws for holding the pipe-sections. These are suitably supported upon but electrically insulated from a suitable bed or frame $c$, on which the movable clamp slides.

$d$ is a handled screw having its bearings in said frame $c$ and adapted to move the clamp $b$ on the slideways of the said frame. Said clamps $a$ $b$ are provided with jaw-sections $a'$ $b'$ for grasping the pipe-sections, which said jaw-sections are operated to bring the same into grasping relation to the pipe by means of hand-screws $e$ $e$ in any ordinary manner.

The clamps $a$ $b$ form the terminals of an electrical circuit, the wires $g$ $g$ of which are in connection with a dynamo-electric machine (not shown) of any suitable construction. The electrical fluid is conveyed to the pipe-sections in the welding process through the wires $g$ and insulated clamps or jaws $a$ $b$, all in the manner common in electrical welding.

Heretofore pipe ends have, before the processional step of electrical welding, been reamed out interiorly and beveled exteriorly, the operation giving a $<$ shape to the end of the pipe in longitudinal section. Thus formed, when end pressure was brought to bear upon the plastic or semifluid extremities of the metal pipes, the normal movement of the said plastic metal is both inward and outward, as will be obvious. To prevent the reduction of the pipe-passage, what has been termed a "core" has been inserted in the pipe and this has limited the inward movement; but the use of core-pieces, mandrels, and the like have entailed frequent losses in that the pipes to be united have been of varying diameters, and, when first manufactured and because of imperfections in the pipe-making machinery, have been provided with interior ribs, bosses, &c., requiring that the pipes be first bored out before inserting the core; but even under ordinary and favorable and the most constant conditions it was quite necessary and essential for the core to be smaller in diameter than the passage to allow for the usual rough and uneven surfaces and enable the core to be easily and quickly inserted and removed, and thus, as a result, after the welding limited inward projections are formed, reducing the passage-way to some extent. The objections to the use of a core have been such as that they have not been constantly employed, and, as a result, the inward projections have been greater and more detrimental to the efficiency of the pipe.

By our process the metal is all turned outward, and, without the use of a core, the pipe is given a flowway of full capacity.

The process of welding the pipe-sections A A together consists in first reaming out the ends of the pipes interiorly, as indicated at $h$ in Fig. 2, so that each of the pipe-sections will present an inward bevel or countersink, and the sharp edges $i$ of the extremities will lie in both sections, at the peripheries of the pipes. In other words, the countersinking or reaming is continued until the inward bevel extends out to the periphery of the pipe to form an angle in the section of the pipe presenting the hypotenuse and one side of a right-angled triangle, the least resistance being at the side opposite the hypotenuse or toward the periphery of the pipe, in which direction the moving metal will flow automatically, as will be understood. When the sections are forced together by the movable clamp-jaw *b*, pressed forward by the hand-screw *d*, and meet at their peripheries, and when the dynamo-electrical current passes through the joint, the said metal at the point of contact will fuse and become soft or plastic because of the heat resulting from the imperfect conductivity at said joint and thus the pressure of the screw *b* is continued.

Heretofore it has been a common practice to scarf the ends of the pipes oppositely or to scarf one pipe exteriorly and the opposite pipe interiorly, so that one section will enter the other and thus produce quite a broad inclined surface of contact. By this construction, however, the outwardly-scarfed section, when pressure was brought to bear thereon while in its plastic condition, turned inwardly, so as to close up the passage through the pipe to a greater or less degree and reduce its flowage or supply capacity. In the present case, by the peculiar method employed, an increased strength is obtained at the joint by the outward flanging of the sections, as shown, and the closing of the passage in the pipe or the reduction of the passage-way is prevented. After the operation of welding is completed the outwardly-flaring flanges at the joint in the pipe are rounded off by hammering to the shape shown in Fig. 4, and in this condition the pipe is complete for the market.

Having thus described the invention, what we claim as new is—

The process of electrically welding metallic pipes which consists in interiorly reaming out both sections of the pipe, until the inward bevel extends to the periphery of the pipe, and thereby reducing outward resistance to end pressure, subjecting the reamed-out extremities to end-to-end pressure and, at the same time, to an electrical current, and thereby softening the extremities and turning the same outward and thus welding the parts together, substantially as set forth.

In testimony that we claim the foregoing we have hereunto set our hands this 21st day of August, 1895.

ALBERT H. MATATALL.
IRA C. MATATALL.

Witnesses:
CHARLES H. PELL,
C. B. PITNEY.